United States Patent [19]

Omori et al.

[11] Patent Number: 4,844,855

[45] Date of Patent: Jul. 4, 1989

[54] METHOD FOR PRODUCING A CENTRIFUGALLY CAST CONCRETE PRODUCT

[75] Inventors: Yoshitaka Omori; Kanzi Suzuki; Fumitoshi Niinuma, all of Tokyo, Japan

[73] Assignee: Onoda Cement Co., Ltd., Tokyo, Japan

[21] Appl. No.: 109,468

[22] Filed: Oct. 16, 1987

[30] Foreign Application Priority Data

Oct. 21, 1986 [JP] Japan ............................. 61-248279

[51] Int. Cl.$^4$ ............................. B28B 1/20; C04B 7/00
[52] U.S. Cl. .................................... 264/311; 106/86; 106/98
[58] Field of Search ................. 264/311, 300; 106/88, 106/98, 86

[56] References Cited

U.S. PATENT DOCUMENTS

| | | | |
|---|---|---|---|
| 3,577,505 | 5/1971 | Ichihara | 264/311 X |
| 3,615,784 | 10/1971 | Cattanach | 106/88 |
| 3,767,541 | 7/1972 | Nishi et al. | 264/311 X |
| 3,972,723 | 8/1976 | Ballé et al. | 106/98 X |
| 4,019,916 | 4/1977 | Golightly et al. | 106/88 |
| 4,046,582 | 9/1977 | Kawamula et al. | 106/88 |
| 4,131,474 | 12/1978 | Uchikawa et al. | 106/98 X |
| 4,174,230 | 11/1979 | Hashimoto et al. | 106/116 X |
| 4,376,831 | 3/1983 | Woo | 106/287.29 X |
| 4,377,416 | 3/1983 | Maul et al. | 106/98 |
| 4,402,752 | 9/1983 | Chesney et al. | 106/98 X |
| 4,441,929 | 4/1984 | Marcellis et al. | 106/98 X |
| 4,447,266 | 5/1984 | Nachfolger | 106/98 X |

FOREIGN PATENT DOCUMENTS

| | | | |
|---|---|---|---|
| 0215808 | 12/1984 | Japan | 264/311 |
| 1021951 | 1/1986 | Japan | 264/311 |

Primary Examiner—Jan H. Silbaugh
Assistant Examiner—Karen D. Kutach
Attorney, Agent, or Firm—Jordan B. Bierman

[57] ABSTRACT

A method for producing centrifugally cast concrete product including charging pumpable concrete into a cylindrical form and rotating the form to cast the concrete by a centrifugal force, in which the concrete contains a high water reducing agent, an air entraining agent and an inorganic fine powder, and 5.5 to 18.5% of air content, thereby considerably reducing the amount of discharged sludge and, in turn, the labor and expenses required for the disposal of sludge, while maintaining the strength of the product as same as or greater than that for conventional products, without the need for complex processes.

4 Claims, No Drawings

METHOD FOR PRODUCING A CENTRIFUGALLY CAST CONCRETE PRODUCT

BACKGROUND OF THE INVENTION

This invention relates to a method for producing a centrifugally cast concrete product, and more specifically to a method for producing a centrifugally cast concrete product by charging concrete into a form using a pump to cast the concrete centrifugally, which provides minimized generation of sludge during centrifugal casting.

In a conventional centrifugal casting method for the production of hollow concrete products such as concrete pole or concrete pile, the mixed concrete is charged using a pump into a cylindrical form, and the form is rotated at a high speed to cast the concrete by a centrifugal force, thereby squeezing out part of mixed water and obtaining a dense concrete product.

Recently, it has become possible, using a high water reducing agent, to produce a high-strength, centifugally cast concrete product by centrifugally casting a concrete which has a considerably reduced water/cement ratio, and now most factories are centrifugally casting concrete which contains a high water reducing agent.

This method can produce a high-strength product, however, it has been defective in that since the addition of the high water reducing agent results in an increased thixotropy of the concrete, material separation of the concrete is accelerated by the centrifugal force and vibration, generating increased amounts of sludge.

The sludge is a strong alkali, which has required considerable expense and labor for disposal at the factories.

SUMMARY OF THE INVENTION

With a view to obviate the prior art defects, it is a primary object of the present invention to provide a method for producing a centrifugally cast concrete product, which can substantially suppress generation of sludge while enabling charging of pumpable concrete into a cylindrical form and maintaining high strength of the product, thereby considerably reducing the expense and labor for the disposal of sludge.

In accordance with the present invention which attains the above subject, there is provided a method for producing a centrifugally cast concrete product, in which pumpable concrete is charged in a cylindrical form, and the form is rotated to cast the concrete, characterized in that the concrete contains a high water reducing agent, an air entraining agent, an inorganic fine powder and a specified content of air.

Concrete used in the present invention has a unit weight of cement of 400 to 460 kg/m$^3$ and a slump of 12 to 16 cm, as in the case of concrete used in factories which contains a high water reducing agent, and by adding the air entraining agent, it contains 5.5 to 18.5% of air, preferably 8 to 16%, and an inorganic fine powder.

The high water reducing agent can be a conventional one such as a naphthalene sulfonic acid-formaldehyde high condensate, a triazine compound high condensate or a sulfonated melamine condensate; commercial products of the agent including MIGHTY 150 (brandname of Kao Corp.) and NL-4000 (brandname of Pozzolith Bussan Co., Ltd.). Depending on the type of the water reducing agent and the composition of the concrete, the water reducing agent is added normally in amounts of 0.8 to 2.0% by weight of cement.

The air entraining agent can be any of conventionally used types such as natural resin acids, higher alcohol sulfonate ester, polyoxyethylene alkylaryl ether and polyoxyethylene octylphenolether; commercial products including VINSOL (brandname of Yamaso Chemicals Co., Ltd.), HIFOAM (brandname of Onoda Corp.), CHUPOL C (brandname of Takemoto Oil and Fat Co., Ltd.).

By changing the amount of the air entraining agent, the air content of the concrete is adjusted to 5.5 to 18.5%, preferably 8 to 16%.

Depending on the mix proportion of the concrete, the inorganic fine powder is added in amounts of 0.7 to 2.7%, preferably 1.05 to 2.3%, by weight of cement.

It is especially preferable to use a combination of finely pulverized silica and clay as an inorganic fine powder. Specifically, the finely pulverized silica preferably has a Blaine specific surface area of 150,000 to 300,000 cm$^2$/g. It is generally called silica fume, and commercial products of silica fume include such as SILICA FLOUR (brandname of Yakushima Denko Co., Ltd.) MICROPOZ (brandname of Narcem A.S.). The clay can be bentonite or the like, and it is particularly preferable to use a clay which has a degree of swelling of 15 to 20 and a Blaine specific surface area of 5,000 to 9,000 cm$^2$/g.

The degree of swelling used in the present invention is determined using the following procedure. 2.0 grams of sample is added dividedly in ten portions to 100 ml of pure water in a 100-ml measuring cylinder with plug, provided, however, that the amount of a portion to be added at one time is adjusted so that the preceding portion smoothly settles down to the bottom of the cylinder with almost no portion adhered to the inner surface of the cylinder, and after the previously added portion is almost completely settled, the next portion is added. After the completion of the addition, the measuring cylinder is plugged and allowed to stand for 24 hours. The apparent volume in milliliter of the sample accumulated in the cylinder is defined as the degree of swelling.

Depending on the mix proportion of the concrete, the finely pulverized silica is added in amounts of 0.2 to 1.2%, preferably 0.3 to 1.0%, by weight of cement, and the clay is added in amounts of 0.5 to 1.5%, preferably 0.75 to 1.3%, by weight of cement.

As can be seen from the examples of the present invention which are described later herein, if the air content of the concrete is less than 5.5%, the content of finely pulverized silica is less than 0.2% by weight of cement, or the clay content is less than 0.5% by weight of cement, the effects of the present invention are not developed sufficiently. On the other hand, if the air content exceeds 18.5%, the strength of the product will decrease considerably. When the content of the finely pulverized silica exceeds 1.2% by weight of cement and the content of the clay exceeds 1.5% by weight of cement, the viscosity of the resulting concrete will be considerably high, and an increased amount of water is required to obtain a specified slump with the same amount of air, resulting in a considerably reduced strength of the product and increased change in slump with time and, in turn, an increased clogging tendency of the pump.

Cement used for the concrete can be any of various types of Portland cement and various types of mixed cement, and usually a normal Portland cement is used.

A concrete with unit weights of cement of 400 to 460 kg/m$^3$, and a slump of 12 to 16 cm which can be fed by a pump, containing a high water reducing agent, an air entraining agent, and an inorganic fine powder, and with the air content adjusted to 5.5 to 18.5%, preferably 8 to 16%, by the air entraining agent, is charged using a pump into a cylindrical form, and the form is rotated to cast the concrete centrifugally. It is preferable to use a centrifugal force of a maximum of 35G; for example, an initial centrifugal force of 1 to 5G is used for 1 to 2 minutes, a medium centrifugal force of 5 to 15G for 1 to 2 minutes, and a final centrifugal force of 15 to 35 G for 2 to 5 minutes.

In such centrifugal casting, a shaving cream-like sludge comprising air bubbles and part of sludge squeezed out of the concrete by the centrifugal force is adhered evenly on the inner peripheral surface of cast concrete. As a result, almost no sludge is discharged after the centrifugal casting. The inorganic fine powder, especially its finely pulverized silica and clay, exerts a strong adsorbing action on air bubbles, fine particles, and water squeezed by the centrifugal force, thereby adhering shaving cream-like sludge having a very high viscosity evenly onto the inner peripheral surface of the hollow cast concrete and considerably strengthening the shaving cream-like sludge adhered on the peripheral surface and its adhesion to the concrete.

The high water reducing agent, air entraining agent and inorganic fine powder used as additives in the present invention can be added separately to the concrete as described in the examples of the present invention, however, alternatively, two or more of the additives can be previously mixed and then added to the concrete.

The centrifugally cast concrete according to the present invention can be cured using a conventional art method, not restricted, such as water curing, steam curing or autoclave curing.

With the method for producing centrifugally cast concrete product according to the present invention, the amount of discharged sludge can be considerably reduced using a pump feed as in the case of the conventional centrifugal casting method while maintaining a high production efficiency, without the need for complex processes. Moreover, the resulting concrete product has a strength equal to or higher than that of prior art products. This provides a considerable reduction in labor and expense required for the disposal of sludge discharged.

DETAILED DESCRIPTION OF THE INVENTION

Examples of the present invention will now be described in detail.

EXAMPLES 1 TO 12

Normal Portland cement as a cement, and produced in Ogasa as fine aggregate, crushed stone produced in Iwase (with a maximum size of 20 mm) as coarse aggregate, MIGHTY 150 (brandname of Kao Corp.) as a high water reducing agent, VINSOL (brandname of Yamaso Chemicals Co., Ltd.) as an air entraining agent, SILICA FLOUR (brandname of Yakushima Denko Co., Ltd.) having a Blaine specific surface area of 220,000 cm$^2$/g as finely pulverized silica, HOUJUN (brandname of Kanto Bentonite Co., Ltd.), a type of bentonite, having a swelling degree of 18 and a Blaine specific surface area of 6,000 cm$^2$/g as clay were combined in the ratios shown in Table 1 which are determined to give a slump of 12–14 cm, and were mixed for 90 seconds in a pan type mixer. The air content of the resulting mixture was measured. The result is shown in Table 1.

The concrete was charged using a pump into a test centrifugal casting form having an inner diameter of 200 mm and a length of 300 mm, which was then subjected to centrifugal casting with an initial force of 2.5G for 1 minute, a medium force of 10G for 1 minute, and a final force of 30G for 2 minutes. At the completion of the casting, the amount of discharged sludge was measured. The cast concrete in the form was allowed to stand, as it was, in a room for 24 hours, and then was stripped from the form. The stripped concrete products were cured in water at 20 degrees C. for 28 days, and then measured for the compressive strength. The measured amounts of discharged sludge and compressive strength are shown in Table 1.

Comparative example 1 is of a mix proportion widely used in the production of centrifugally cast concrete products such as concrete pole and concrete pile, which uses only the high water reducing agent as an additive. Examples 1 to 12 of the present invention use the high water reducing agent, the air entraining agent, and finely pulverized silica and clay as inorganic fine powder, with air contents of the concrete adjusted within the range specified in the present invention. Comparative examples 2 to 6 use the high water reducing agent and the air entraining agent, but no inorganic fine powder. Comparative examples 7 to 12 use the high water reducing agent, the air entraining agent and the inorganic fine powder, with air contents exceeding the range specified in the present invention. Comparative examples 13 to 15 use the high water reducing agent, the air entraining agent, and finely pulverized silica and clay as inorganic fine powder, but the amounts of the finely pulverized silica and clay are more than 1.2% and 1.5%, respectively, by weight of cement.

TABLE 1

| Example | Mix proportion (kg/m$^3$) | | | | | | | | Water/cement ratio (%) | Air content (%) | Discharged sludge (kg/m$^3$) | Compressive strength (kgf/cm$^2$) | Remarks |
|---|---|---|---|---|---|---|---|---|---|---|---|---|---|
| | Cement | Water | Fine aggregate | Coarse aggregate | High water reducing agent | Air entraining agent | Fine silica (*) | Clay (*) | | | | | |
| 1 | 450 | 119 | 577 | 882 | 5.4 | 1.15 | 0.9(0.2) | 2.3(0.5) | 26.5 | 18.3 | 7 | 548 | Shaving cream-like sludge adheres onto the inner surface of product. |
| 2 | 450 | 119 | 577 | 882 | 5.4 | 1.15 | 2.3(0.5) | 3.4(0.75) | 26.5 | 18.2 | 2 | 554 | Same as above |
| 3 | 450 | 122 | 576 | 880 | 5.4 | 1.15 | 3.4(0.75) | 4.5(1.0) | 27.0 | 18.1 | 0 | 552 | Same as above |

TABLE 1-continued

| | Cement | Water | Fine aggregate | Coarse aggregate | High water reducing agent | Air entraining agent | Fine silica (*) | Clay (*) | Water/cement ratio (%) | Air content (%) | Discharged sludge (kg/m³) | Compressive strength (kgf/cm²) | Remarks |
|---|---|---|---|---|---|---|---|---|---|---|---|---|---|
| 4 | 450 | 124 | 576 | 880 | 5.4 | 1.15 | 5.4(1.2) | 6.8(1.5) | 27.5 | 18.0 | 0 | 550 | Same as above |
| 5 | 450 | 137 | 686 | 1048 | 5.4 | 0.27 | 0.9(0.2) | 2.3(0.5) | 30.5 | 6.2 | 3 | 566 | Same as above |
| 6 | 450 | 137 | 687 | 1050 | 5.4 | 0.27 | 2.3(0.5) | 3.4(0.75) | 30.5 | 6.0 | 0 | 568 | Same as above |
| 7 | 450 | 140 | 679 | 1038 | 5.4 | 0.27 | 3.4(0.75) | 4.5(1.0) | 31.0 | 6.4 | 0 | 564 | Same as above |
| 8 | 450 | 142 | 684 | 1045 | 5.4 | 0.27 | 5.4(1.2) | 6.8(1.5) | 31.5 | 5.8 | 0 | 554 | Same as above |
| 9 | 450 | 129 | 673 | 1029 | 5.4 | 0.4 | 0.9(0.2) | 2.3(0.5) | 28.5 | 8.1 | 1 | 569 | Same as above |
| 10 | 450 | 129 | 673 | 1029 | 5.4 | 0.4 | 1.4(0.5) | 3.4(0.75) | 28.5 | 8.1 | 0 | 562 | Same as above |
| 11 | 450 | 131 | 672 | 1027 | 5.4 | 0.4 | 3.4(0.75) | 4.5(1.0) | 29.0 | 8.0 | 0 | 560 | Same as above |
| 12 | 450 | 133 | 672 | 1027 | 5.4 | 0.4 | 5.4(1.2) | 6.8(1.5) | 29.5 | 7.8 | 0 | 551 | Same as above |

| Comparative example | Mix proportion (kg/m³) | | | | | | | | Water/cement ratio (%) | Air content (%) | Discharged sludge (kg/m³) | Compressive strength (kgf/cm²) | Remarks |
|---|---|---|---|---|---|---|---|---|---|---|---|---|---|
| | Cement | Water | Fine aggregate | Coarse aggregate | High water reducing agent | Air entraining agent | Fine silica (*) | Clay (*) | | | | | |
| 1 | 450 | 149 | 697 | 1095 | 5.4 | — | 0(0) | 0(0) | 33.0 | 1.9 | 65 | 551 | Paste-like sludge does not adhere onto the inner surface of product. |
| 2 | 450 | 115 | 565 | 864 | 5.4 | 1.35 | 0(0) | 0(0) | 25.5 | 19.7 | 49 | 446 | Shaving cream-like sludge adheres on the inner surface of product, but partly comes off. |
| 3 | 450 | 117 | 581 | 888 | 5.4 | 1.15 | 0(0) | 0(0) | 26.0 | 18.1 | 31 | 462 | Same as above |
| 4 | 450 | 140 | 699 | 1096 | 5.4 | 0.18 | 0(0) | 0(0) | 31.0 | 4.0 | 31 | 560 | Same as above |
| 5 | 450 | 135 | 718 | 1118 | 5.4 | 0.27 | 0(0) | 0(0) | 30.0 | 6.4 | 25 | 562 | Same as above |
| 6 | 450 | 126 | 724 | 1129 | 5.4 | 0.40 | 0(0) | 0(0) | 28.0 | 8.0 | 21 | 568 | Same as above |
| 7 | 450 | 117 | 561 | 857 | 5.4 | 1.35 | 0.9(0.2) | 2.3(0.5) | 26.0 | 19.9 | 31 | 451 | Same as above |
| 8 | 450 | 119 | 558 | 853 | 5.4 | 1.35 | 3.4(0.75) | 4.5(1.0) | 26.5 | 20.0 | 23 | 452 | Same as above |
| 9 | 450 | 121 | 554 | 846 | 5.4 | 1.35 | 5.4(1.2) | 6.8(1.5) | 27.0 | 20.2 | 25 | 418 | Same as above |
| 10 | 450 | 142 | 696 | 1065 | 5.4 | 0.18 | 0.9(0.2) | 2.3(0.5) | 31.5 | 4.4 | 20 | 562 | Same as above |
| 11 | 450 | 144 | 702 | 1074 | 5.4 | 0.18 | 3.4(0.75) | 4.5(1.0) | 32.0 | 3.9 | 16 | 564 | Same as above |
| 12 | 450 | 146 | 699 | 1071 | 5.4 | 0.18 | 5.4(1.2) | 6.8(1.5) | 32.5 | 4.2 | 20 | 512 | Same as above |
| 13 | 450 | 142 | 564 | 862 | 5.4 | 1.15 | 6.8(1.5) | 7.9(1.75) | 31.5 | 18.2 | 4 | 421 | Shaving cream-like sludge adheres onto the inner surface of product. |
| 14 | 450 | 149 | 673 | 1029 | 5.4 | 0.27 | 6.8(1.5) | 7.9(1.75) | 33.0 | 6.1 | 5 | 498 | Same as above |
| 15 | 450 | 144 | 683 | 1075 | 5.4 | 0.40 | 6.8(1.5) | 7.9(1.75) | 32.0 | 8.0 | 3 | 496 | Same as above |

(*): Figures within parentheses refer to weight % to cement.

Referring to Table 1, with the mix proportion of comparative example 1 which is used in the production of centrifugally cast concrete products such as poles and piles, amounts of sludge discharged after centrifugal casting are 65 kg per 1 m³ of concrete, whereas those for examples 1 to 12 of the present invention which have an air content of 5.5 to 18.5% are 0 to 7 kg per 1 m³ of concrete, thus the amounts of discharged sludge in the examples of the present invention are 89 to 100% smaller than that for comparative example 1. The compressive strength of the concrete products in examples 1 to 12 of the present invention is almost the same as or greater than that for comparative example 1.

On the other hand, amounts of discharged sludge in comparative examples 2 to 6 which use the high water reducing agent and the air entraining agent are 21 to 49 kg per 1 m³ of concrete, with only reduction of 25 to 68% from that for comparative example 1.

In comparative examples 7 to 12 which use the high water reducing agent, the air entraining agent and the inorganic fine powder, but with air contents of the concrete exceeding the range specified in the present invention, the amounts of discharged sludge are 16 to 31 kg per 1 m³ of concrete, which are only reduction of 52 to 75% from that for comparative example.

Further, in comparative examples 13 to 15 which uses the high water reducing agent, the air entraining agent, and finely pulverized silica and clay as inorganic fine powder, but the content of finely pulverized silica exceeds 1.2% by weight of cement and that of clay exceeds 1.5%, the amounts of discharged sludge are 3 to 5 kg per 1 m³ of concrete, but the compressive strength is considerably lower than that for the examples of the present invention which have the same slump and air content. This is because when the content of the finely pulverized silica or clay is increased, a much greater unit weight of water is required to produce concrete having the same slump and air content.

As described above, examples 1 to 12 of the present invention provide considerably reduced amounts of discharged sludge and greater compressive strength of the products compared to comparative example 1 and comparative examples 2 to 15 due to synergistic effects of the use of the high water reducing agent, the air entraining agent, and the inorganic fine powder, and the air contents of the concrete adjusted to 5.5 to 18.5%.

We claim:

1. A method for producing a centrifugally cast concrete product comprising charging pumpable concrete containing a high water reducing agent into a cylindrical form and rotating said form to cast said concrete by centrifugal force wherein said concrete has a unit cement weight of 400 to 460 kg/m³ of cement and a slump of 12 to 16 cm and 0.2 to 1.2% of finely pulverized silica by weight of cement and 0.5 to 1.5% of clay by weight of cement and an air entraining agent, said concrete having air contents of 5.5 to 18.5%.

2. The method of claim 1 wherein said finely pulverized silica has a Blain specific surface area of 150,000 to 300,000 cm²/g and said clay has a degree of swelling of 15 to 20, defined as an apparent volume in milliliter of 2 grams of clay after being immersed in 100 milliliters of pure water for 24 hours, and a Blaine specific surface area of 5,000 to 9,000 cm$^2$/g.

3. A method for producing a centrifugally cast concrete product as claimed in claim 1, wherein said finely 4. A method for producing a centrifugally cast concrete product as claimed in claim 1, wherein said clay has a degree of swelling of 15 to 20, defined as an apparent volume in milliliter of 2.0 grams of clay after being immersed in 100 milliliters of pure water for 24 hours, and a Blaine specific surface area of 5,000 to 9,000 cm$^2$/g.

* * * * *